United States Patent [19]
Hann et al.

[11] Patent Number: 5,277,823
[45] Date of Patent: Jan. 11, 1994

[54] SILICA SCALE INHIBITION

[75] Inventors: William M. Hann, Gwynedd; Judy H. Bardsley, Salford; Susan T. Robertson, Ambler; Jan E. Shulman, Newtown, all of Pa.

[73] Assignee: Rohm and Haas Company, Philadelphia, Pa.

[21] Appl. No.: 5,411

[22] Filed: Jan. 19, 1993

Related U.S. Application Data

[63] Continuation of Ser. No. 805,434, Dec. 11, 1991, abandoned, which is a continuation-in-part of Ser. No. 527,420, May 23, 1990, abandoned.

[51] Int. Cl.$^5$ .............................................. C02F 5/08
[52] U.S. Cl. .................... 210/696; 60/641.2; 127/61; 166/244.1; 210/698; 210/701; 252/175; 252/180; 252/181
[58] Field of Search ............... 166/244.1, 310; 210/696–701; 252/82, 180, 181, 175; 60/641.2; 127/61

[56] References Cited

U.S. PATENT DOCUMENTS

| | | | |
|---|---|---|---|
| 2,723,956 | 11/1955 | Johnson | 210/698 |
| 4,288,327 | 9/1981 | Godlewski et al. | 210/698 |
| 4,584,104 | 4/1986 | Dubin | 210/696 |
| 4,797,223 | 1/1989 | Amick et al. | 210/701 |
| 4,830,766 | 5/1989 | Gallup et al. | 210/696 |
| 4,913,823 | 4/1990 | Lipinski et al. | 252/180 |
| 4,933,090 | 6/1990 | Gill et al. | 210/700 |
| 4,936,987 | 6/1990 | Persinski et al. | 210/701 |
| 4,952,326 | 8/1990 | Amjad et al. | 210/701 |
| 5,078,879 | 1/1992 | Gill et al. | 210/701 |

FOREIGN PATENT DOCUMENTS 3743739  7/1989  Fed. Rep. of Germany.

Primary Examiner—Peter A. Hruskoci
Attorney, Agent, or Firm—David T. Banchik; James G. Vouros

[57] ABSTRACT

A method for inhibiting silica scale formation in aqueous systems using selected low molecular weight (meth-)acrylic or maleic acid based copolymers or terpolymers, magnesium ion alone, or the selected copolymers and terpolymers with aluminum ion or magnesium ion, or polyacrylic or polymaleic acid with aluminum ion or magnesium ion.

15 Claims, 5 Drawing Sheets

SILICA SCALE INHIBITION

RELATED APPLICATIONS

This is a continuation of U.S. application Ser. No. 07/805,434, filed Dec. 11, 1991, now abandoned which was a continuation-in-part of U.S. application Ser. No. 07/527,420, filed May 23, 1990, now abandoned.

DESCRIPTION OF INVENTION

This invention relates to a method for controlling silica and silicate fouling problems in aqueous systems. More particularly the invention is directed to the use of certain low molecular weight water soluble (meth)acrylic or maleic acid based polymers and aluminum or magnesium ions to inhibit deposition of magnesium silicate and other silicate and silica scales on surfaces.

BACKGROUND OF THE INVENTION

Silica is one of major fouling problems in many processes using water. Silica is difficult to deal with because it can assume many low solubility chemical forms depending on the conditions. Below about pH 7 for example, monomeric silica tends to polymerize to form oligomeric or colloidal silica. At higher pH's particularly above about pH 9.5, silica can form monomeric silicate ion. Since conversion can be slow, all of these forms may exist at any one time depending on the history of the system. Furthermore, the silicate ion can react with polyvalent cations like magnesium and calcium commonly present in process waters to produce salts with very limited solubility. Thus it is common for a mixture of many forms to be present: monomeric, oligomeric and colloidal silica; magnesium silicate, calcium silicate and other silicate salts. In describing this complex system, it is common practice to refer to the mixture merely as silica or as silica and silicate. Herein these terms are used interchangeably.

A further complication in controlling silica and silicate fouling is that colloidal silica tends to be more soluble as temperature is raised while polyvalent metal salts of the silicate ion tends to be less soluble with increasing temperature.

Two possible mechanisms for controlling silica or silicate salts from fouling or depositing on a surface during a process are: 1) inhibiting precipitation of the material from the process water, and 2) dispersing the material once it has formed in the bulk water to prevent it from attaching to surfaces. The exact mechanism by which a specific scale inhibitor functions, however, is not well understood. The additives of this invention may be operating by either or both of these routes.

Processes that would likely benefit from a material that could inhibit the deposition of silica or silicate salts from water are, for example: cooling water, boiler water, geothermal process to generate electricity or for heating, and sugar (particularly cane and beet) processing. In each of these processes, heat is transferred to or from the water. In three of these processes, cooling water, boiler water and sugar processing, heat is added to the water and evaporation of some of the water takes place. As the water is evaporated the silica (or silicates) will concentrate. If the silica concentration exceeds its solubility, it can deposit to form either a vitreous coating or an adherent scale that can normally be removed only by laborious mechanical or chemical cleaning. In geothermal processes, hot water laden with silica or silicates is used to heat homes or factories or is converted to steam to drive a turbine and generate electricity. At some point in each of the above four processes, heat is extracted from the water, making any dissolved silicate less soluble and thus likely to deposit on surfaces.

The current practice in each of these four processes is to mechanically limit the amount of silica or silicates that build up in the water so that the catastrophic consequences of deposition of these compounds does not occur. For example in cooling water, the accepted practice is to limit the amount of silica or silicates to about 180 ppm, expressed as $SiO_2$. In addition, deposition of $CaCO_3$ (which can act as a nucleating agent for silica or silicates to deposit upon) is controlled by well known inhibitors such as phosphonates or polymers such as polyacrylic acid or polymaleic acid. Reportedly, the current best available polymer for control of silica or silicates in cooling water is polymaleic acid of about 1000–1300 weight average molecular weight. Because the silica is limited to 180 ppm and because in many arid areas of the U.S. and other parts of the world make-up water may contain from 50–90 ppm silica, cooling water can only be concentrated 2 to 3 times before the risk of silica or silicate deposition becomes too great. A polymer that would enable greater re-use or cycling of this silica-limited cooling water would be a great benefit to these areas.

Similarly in boiler water, the American Society of Mechanical Engineers recommends that silica be limited to certain levels depending on the operating pressure of the boiler. For example, in low pressure boilers (less than 300 psig) the amount of silica, as $SiO_2$, should be kept below 150 ppm. As the pressure is raised, the level of silica that can be tolerated in the recirculating boiler water becomes progressively less. A polymer that would enable boilers to operate at higher cycles of concentration, particularly low pressure boilers where silica volatilization is not a great concern, would allow more energy-efficient use of the heated water.

In sugar production, especially cane sugar where silica levels are highest, the sugar evaporators are cleaned after about 2–3 months to prevent excessive deposition of silica. The cleaning normally involves a vigorous mechanical brushing with harsh chemicals to remove the silica and other salts. An inhibitor that could extend the length of the sugar evaporation processing between cleanings or that would make the cleaning less ardous would extend the life of the evaporators and increase their output during a season.

Geothermal process presently control the temperature drop as a means of preventing the deposition of silica on equipment surfaces. An inhibitor that limits silica deposition would allow the temperature drop in this process to be greater, and allow more efficient use of the heat in the geothermally produced water.

In addition to preventing fouling of surfaces with silica or silicates, an inhibitor or dispersant for this foulant would allow the use of higher levels of silica/silicates for corrosion control. In potable water, silicates are added to the water to prevent "red water" from corrosion of water mains made of ferrous metals. In cooling water, an inhibitor has long been sought after that would enable silica to be used as an a non-toxic corrosion inhibitor.

In enhanced oil recovery, silicates are added to the drive fluid to help move the oil through the formation. An effective silica-inhibitor would prevent the formation from being clogged with metal ion silicates, thus allowing the efficient recovery of the oil from the underground formation.

Other processes that have need of a silica or silicate inhibitor or dispersant are detergent applications such as laundering, cleaning and dishwashing. In laundering, the silica inhibitor would prevent incrustation or stiffening of the fabric by neutral silicates in the water or by silicates added to the detergent formulation as builders. An inhibitor would have the added benefit of preventing deposition of the silica or silicates on surfaces of the washing machine, such as heating elements and plumbing. In dishwashing, silicates are also added as builders and can produce scale and incrustation analogous to laundering.

(Meth)acrylic acid and maleic acid based polymers have long been used in water treatment. Co- and terpolymers of (meth)acrylic acid with 2-acrylamido-2-methyl propane sulfonic acid (AMPS) in particular have been proposed for inhibiting sulfate, carbonate and phosphate scale as well as for other treatments like removing rust. For example, U.S. Pat. Nos. 3,332,904; 3,692,673; 3,709,815; 3,709,816; 3,928,196; 3,806,367 and 3,898,037 are directed to using AMPS containing polymers. GB No. 2,082,600 proposes an acrylic acid/AMPS/acrylamide polymer and WO No. 83/02607 and WO No. 83/02608 are directed to (meth)acrylic acid/AMPS copolymers as inhibitors of these scales.

In addition U.S. Pat. No. 4,711,725 disclosed the use of terpolymers of (meth)acrylic acid/AMPS/substituted acrylamides for inhibiting the precipitation of calcium phosphate.

The inhibition of silica and silicate scaling specifically has also been addressed in several publications. U.S. Pat. No. 4,029,577 is directed to the use of acrylic acid/hydroxylated lower alkyl acrylate copolymers to control a spectrum of scale imparting precipitates including magnesium and calcium silicates. U.S. Pat. No. 4,499,002 discloses (meth)acrylic/(meth)acrylamide/alkoxylated primary alcohol ester of (meth)acrylic acid for the same purpose. Japanese Patent Disclosures 61-107997 and 61-107998 are directed to polyacrylamide and selected (meth)acrylic acid copolymers to control silica scale.

The term copolymer is widely employed in publications, but not always with the same meaning, sometimes referring to a polymer from only two monomers and other times to a polymer from two or more. To avoid ambiguity, the term copolymer as used herein is defined as a polymer being derived from only two monomers and a terpolymer is a polymer derived from three or more monomers.

Despite the large number of publications in the area of scale inhibitors, none provide an effective method to control the troublesome silica and silicate scale. Limiting the level of silica introduced or allowed to accumulate in the aqueous system is still the primary method of dealing with the problem.

It is, therefore, an objective of this invention to provide a method that effectively inhibits silica depositions in aqueous systems.

It is an objective to provide a chemical method using additives to replace the mechanical techniques of dealing with silica scaling by limiting the concentration of silica allowed to build-up in the system or by the labor intensive removal of silica deposits.

SUMMARY OF THE INVENTION

We have unexpectedly discovered that the difficult silica and silicate scaling problem in aqueous systems can be controlled by the addition of one or more selected materials to the aqueous system. The selected materials are:

a) certain low molecular weight (meth)acrylic or maleic acid based copolymer or terpolymers and salts thereof, or b) magnesium ion, c) the co- and terpolymers of (a) in combinations with aluminum ion or magnesium ion, or d) low molecular weight polyacrylic acid or polymaleic acid or salts thereof, in combination with aluminum ion or magnesium ion.

The copolymers contain units derived from the following:

a) from about 20 to about 85 weight percent of (meth)acrylic acid or maleic acid, and b) from greater than about 11 to about 80 weight percent of a (meth)acrylamido methylpropane sulfonic acid, or styrene sulfonic acid, or c) from about 5 to about 30 weight percent of (meth)acrylamide or a substituted (meth)acrylamide, or d) from about 30 to about 60 weight percent of isobutylene or diisobutylene.

The terpolymers contain units derived from the following:

a) from about 30 to about 80 weight percent of (meth)acrylic acid or maleic acid, and b) from greater than 11 to about 65 weight percent of a (meth)acrylamido methyl propane sulfonic acid or styrene sulfonic acid, and c) from about 5 to about 30 weight percent of (meth)acrylamide or a substituted (meth)acrylamide, or d) from about 5 to about 30 weight percent of vinyl alcohol, allyl alcohol, vinyl esters, an ester of vinyl or allyl alcohol, styrene, isobutylene or diisobutylene, or e) from about 3 to about 30 weight percent of styrene sulfonic acid when (meth)acrylamido methylpropane sulfonic acid is present.

In this specification the term (meth)acrylic means either acrylic or methacrylic, the term (meth)acrylamido means either acrylamido or methacrylamido and the term (meth)acrylamide means either acrylamide or methacrylamide.

DETAILED DESCRIPTION OF THE INVENTION

Figure 1:
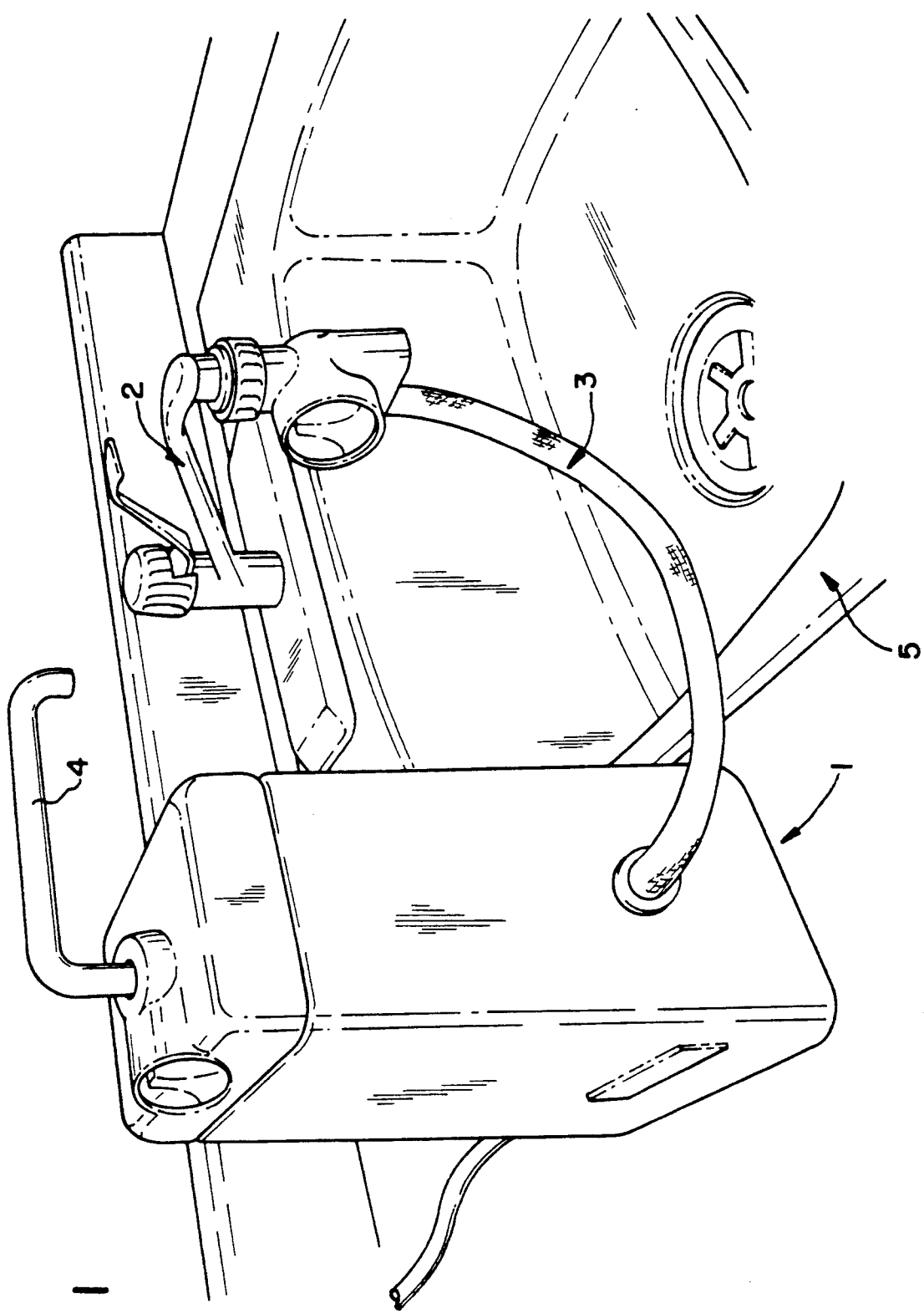

According to the present invention, the method of inhibiting silica and silicate scale in aqueous systems comprises the addition to the aqueous system of a scale inhibiting amount of one of the following:

1. A low molecular weight (meth)acrylic or maleic acid based copolymer or terpolymer of weight average molecular weight from about 1000 to 25000 and more preferably from about 2000 to about 10,000. The copolymer is formed from:

a) about 20 to about 85 weight percent of (meth)acrylic acid or maleic acid represented by the structural formula (A):

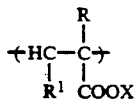

where R is H or CH$_3$, R$^1$ is H or COOX and X is H or metal cation, and b) from greater than 11 to about 80 weight percent of a (meth)acrylamido methyl propane sulfonic acid or styrene sulfonic acid where the (meth)acrylamido methyl propanesulfonic acid has the structural formula (B):

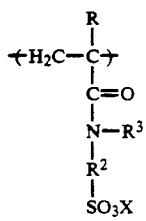

where R is H or CH$_3$, X is H or metal cation, R$^2$ is C$_{1-8}$ alkyl or phenyl and R$^3$ is H or C$_{1-4}$ alkyl, or c) from about 15 to about 30 weight percent of an acrylamide or a substituted (meth)acrylamide represented by the formula (C):

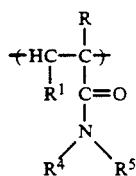

where R is H or CH$_3$, R$^1$ is H or COOX, X is H or metal cation and R$^4$ and R$^5$ are either H or a C$_{1-8}$ alkyl but both cannot be H, or d) from about 30 to 60 weight percent of isobutylene or diisobutylene.

The terpolymer is formed from:
a) from about 30 to about 80 weight percent of (meth)acrylic acid or maleic acid represented by formula (A), and
b) from greater than 11 to about 65 weight percent of a (meth)acrylamido methyl propane sulfonic acid or styrene sulfonic acid where the (meth)acrylamido methyl propane sulfonic acid has the structural formula (B), and
c) from about 5 to about 30 weight percent of (meth)acrylamide or a substituted (meth)acrylamide which is represented by the formula (C), or
d) from about 5 to about 30 weight percent of vinyl alcohol, allyl alcohol, an ester of vinyl or allyl alcohol, vinyl esters, styrene, isobutylene or diisobutylene, where the vinyl ester is represented by formula (E):

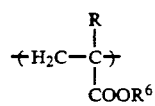

where R$^6$ is C$_{1-6}$ alkyl, or C$_{6-10}$ aryl or aralkyl, or $$\begin{array}{c} R \\ | \\ (CH_2CH-O)_nR^7, \end{array}$$

where R$^7$ is H, or C$_{1-6}$ alkyl or PO$_3$X and X is H or metal cation, R is H or CH$_3$, and n is 1-3, or e) from about 3 to about 30 weight percent of styrene sulfonic acid when (meth)acrylamido methylpropane sulfonic acid is present.

As used herein an ester of vinyl or allyl alcohol includes the reaction product of (C$_1$-C$_4$) alkanoic acids with a vinyl or allyl alcohol, such as for example vinyl acetate.

The terpolymer may also be derived from more than 3 monomers; one from a., one from b. and two or more from c., d. and e.

2. A mixture of a copolymer or terpolymer with aluminum ion or magnesium ion where the copolymer and terpolymer are as described in 1. The Al$^{+3}$ ion and Mg$^{+2}$ ion can be provided by any water soluble salt of Al or Mg, such as the chlorides, sulfates or nitrates. The components of the mixture can be premixed or can be added separately to the aqueous system.

3. A mixture of a polyacrylic acid or polymaleic acid or salts thereof of weight average molecular weight from about 1000 to about 25000 with aluminum ion or magnesium ion. The polymers are derived from units represented by structural formula (A).

4. Magnesium ion. Any water soluble magnesium salt is suitable; examples are magnesium chloride, magnesium sulfate and magnesium nitrate.

The discovery that the addition of magnesium ion, to an aqueous system that already has magnesium ion present, can reduce scaling of silica and silicates is particularly surprising.

We have found that the preferred additives are (1) terpolymers of acrylic acid, AMPS and a substituted acrylamide, vinyl acetate, styrene or styrene sulfonic acid (2) copolymers of maleic acid and styrene sulfonic acid and (3) magnesium chloride. Most preferred is the terpolymer of 45 to 67 percent acrylic acid, 17 to 40 percent AMPS and 5-30 percent of tertiary butyl acrylamide, vinyl acetate, styrene or styrene sulfonic acid.

The amount of additives that provides a "scale inhibiting amount" will vary with the aqueous system being treated. Generally the amount will be in the range of 0.1 to 500 parts per million.

POLYMER SYNTHESIS

The prior art discloses several suitable synthesis methods for preparing the low molecular weight (meth)acrylic and maleic acid based polymers useful is the present invention.

U.S. Pat. No. 4,314,004 is directed to one such suitable copolymer synthesis method and the disclosure thereof is incorporated herein by reference. This method requires a specific concentration range of a polymerization initiator and a specific molar ratio range of the initiator concentration and the concentration of certain metal salts to obtain the desired low molecular weight polymers useful in the present invention. The preferred polymerization initiators are peroxide compounds such as ammonium persulfate, potassium persulfate, hydrogen peroxide and t-butyl hydroperoxide. The preferred concentration range of the initiator is between about 1 to about 20 weight percent based on the weight of monomers. the metal salt used to regulate molecular weight preferably include cuprous and cupric chloride or bromide, cupric sulfate, cupric acetate, ferrous and ferric chloride, ferrous sulfate and ferric and ferrous phosphate. The molar ratio of the polymerization initiator to the metal salt is preferably between about 40:1 to about 80:1. The homopolymers, copolymers and terpolymers useful in this invention are preferably prepared in water at a polymer concentration of abut 40 to about 50 percent based on total weight of solution.

Another method useful to prepare these low molecular weight copolymers and terpolymers is described in U.S. Pat. No. 4,301,266, the disclosure thereof also being incorporated herein by reference. In this process isopropanol is used as the molecular weight regulator as well as the reaction solvent. The reaction solvent may also be an aqueous mixture of isopropanol containing at least 45 weight percent isopropanol. The polymerization initiator is a free radical initiator such as hydrogen peroxide, sodium persulfate, potassium persulfate, or benzoyl peroxide. The polymerization is carried out under pressure at a temperature of 120° to 200° C. The concentration of the copolymer in the solvent is preferably 25 to 45 percent based on the weight of the total solution. When polymerization is complete, the isopropanol is distilled from the reactor and the polymer may be neutralized with a base.

Still another method for preparing low molecular weight copolymers and terpolymers useful in this invention is described in U.S. Pat. No. 3,646,099, the disclosure thereof also being incorporated herein by reference. This process is directed to the preparation of cyano-containing oligomers; however, it is also applicable for preparing low molecular weight polymers useful in the present invention. This process employs a bisulfite salt as the polymerization molecular weight regulator and the resulting polymers prepared thereby are sulfonate terminated. The preferred bisulfite salt is sodium bisulfite at a concentration of between 3 and 20 weight percent based on the weight of monomers. The free radical polymerization initiator is ammonium, sodium or potassium persulfate, hydrogen peroxide or t-butyl hydroperoxide. The concentration of the initiator is between about 0.2 to about 10 weight percent based on monomers. The polymerization temperature is preferably between 20° and 65° C. and the concentration of the polymers in the aqueous solvent is between 25 and 55 weight percent based on total solution weight.

EVALUATION OF INHIBITORS

The following test was employed to demonstrate the efficacy of the additives of the present invention for either preventing the precipitation of silica and silicate species or for the dispersing of these species. Although the exact mechanism of action of the inhibitors is not completely understood, an additive that minimizes the turbidity of the produced mixture is considered an effective silica and silicate inhibitor. Additives that produce a mixture in this test of less than eight nephelometric turbidity units (NTU) are considered improvements over the current available technology.

The test procedure used was one which simulated silicaladen process water conditions.

A 1% polymer solution was prepared and neutralized to pH 7.
A 1% salt inhibitor solution was prepared.
To a tared 8 oz. plastic bottle was added:

1.44 g sodium silicate solution (34.8% active, $Na_2$:$SiO_2$::1:3.35)
50.11 g Polished deionized water.
Stir to Mix.
To a rinsed and dried 4 oz. jar was added:
75 ml deionized water
6.5 ml of the 1% sodium silicate solution prepared above.
1.0 ml inhibitor or salt inhibitor solution.
The samples were then placed in a 70° C. water bath with moderate shaking for 30 mins.
The samples were then removed from the bath and to them was added: (use a glass stir rod to stir between each addition)
6.1 ml 1% by weight $MgCl_2.6H_2O$ solution
4.4 ml 1% by weight $CaCl_2.2H_2O$ solution
5.0 ml 1% by weight $NaHCO_3$ solution
1.8 to 2.1 ml of 0.1N HCl to adjust pH to 8±0.2
The samples are then replaced in the water bath for 30 minutes with moderate agitation and then removed from the bath and allowed to cool to room temperature for 1 hour.

The turbidity of the samples was measured in nephelometric turbidity units (NTU) using a model DRT100D turbidity meter, manufactured by HF Instruments Inc., Fort Myers, Fla.

The final concentrations of the ions in the test solution were as follows:
500 ppm Si, as $SiO_2$
300 ppm $Ca^{+2}$, as $CaCO_3$
300 ppm $Mg^{+2}$, as $CaCO_3$
300 ppm $HCO_3-$, as $CaCO_3$
100 ppm inhibitor, as acid
0, 80 or 140 mg/l ionic additive Higher turbidity in the sample indicates more precipitate was formed. Lower turbidity indicates the mixture is inhibited from precipitating. The results of this test are presented in Tables I, II, and III.

TABLE I

| | EFFECT OF POLYMERS | | |
|---|---|---|---|
| Example | Composition weight percent | Mw | NTU |
| 56 | (no polymer control) | — | 22.6 |
| 1 | polymaleic acid (comparative) | 1200 | 12.6 |
| 2 | polyethylene glycol (comparative) | 600 | 23.3 |
| 3 | polyacrylic acid (comparative) | 1000 | 17.0 |
| 4 | polyacrylic acid (comparative) | 4500 | 26.7 |
| 5 | polyacrylic acid (comparative) | 10000 | 36.2 |
| 6 | polymethacrylic acid (comparative) | 4000 | 40.1 |
| 7 | 50 MAL/50 AS (comparative) | 2900 | 8.7 |
| 8 | 40 MAL/60 SS | 4500 | 6.6 |
| 9 | 20 MAL/80 SS | 7900 | 2.4 |
| 10 | 50 MAL/50 DIB | 15000 | 5.9 |
| 11 | 77 AA/23 AMPS | 4500 | 3.9 |
| 12 | 50 AA/50 AMPS | 7630 | 4.6 |
| 13 | 90 AA/10 AM (comparative) | 1800 | 19.7 |
| 14 | 80 AA/20 AM (comparative) | 3290 | 11.7 |
| 15 | 80 AA/20 tBAM | 4320 | 6.9 |
| 16 | 70 AA/30 tBAM | 2270 | 4.6 |
| 17 | 69 AA/11 AMPS/20 HEMA (comparative) | 7690 | 12.6 |
| 18 | 63 AA/17 AMPS/20 HEMA | 6860 | 1.2 |
| 19 | 57 AA/23 AMPS/20 AM | 3750 | 1.3 |
| 20 | 55 AA/40 AMPS/5 tBAM | 4490 | 3.4 |
| 21 | 55 AA/40 AMPS/5 tBAM | 8840 | 4.3 |
| 22 | 45 AA/40 AMPS/15 tBAM | 9040 | 3.7 |
| 23 | 62 AA/23 AMPS/15 tBAM | 4500 | 1.9 |
| 24 | 62 AA/23 AMPS/15 tBAM | 9620 | 1.9 |
| 25 | 62 AA/23 AMPS/15 tBAM | 13300 | 3.2 |
| 26 | 57 AA/23 AMPS/20 tBAM | 4610 | 6.2 |
| 27 | 63 AA/22 AMPS/15 tBAM | 10500 | 4.7 |
| 28 | 62 AA/23 AMPS/15 VAC | 8020 | 1.7 |
| 29 | 62 AA/23 AMPS/15 VAC | 4840 | 1.0 |

TABLE I-continued

EFFECT OF POLYMERS

| Example | Composition weight percent | Mw | NTU |
|---|---|---|---|
| 30 | 57 AA/23 AMPS/20 EA | 4840 | 1.1 |
| 31 | 57 AA/23 AMPS/20 HEMA | 5430 | 1.6 |
| 32 | 47 AA/23 AMPS/30 HEMA | 5920 | 2.2 |
| 33 | 63 AA/17 AMPS 20 HPA | 5410 | 1.9 |
| 34 | 57 AA/23 AMPS/20 HPA | 3970 | 4.4 |
| 35 | 57 AA/23 AMPS/20 DMAM | 4050 | 4.7 |
| 36 | 57 AA/23 AMPS/20 AAEM | 7400 | 1.0 |
| 37 | 57 AA/23 AMPS/20 TOAM | 4410 | 2.7 |
| 38 | 57 AA/23 AMPS/10 HEMA/10 tBAM | 5340 | 2.9 |
| 39 | 57 AA/23 AMPS/10 HEMA/10 EA | 5540 | 3.3 |
| 40 | 57 AA/23 AMPS/10 tBAM/10 EA | 5370 | 4.0 |
| 41 | 57 AA/23 AMPS/20 PEM | 9840 | 2.7 |
| 42 | 57 AA/23 AMPS/20 DMAPMA | 6390 | 5.5 |
| 43 | 57 AA/23 AMPS/20 BMAM | 6250 | 4.3 |
| 44 | 57 AA/23 AMPS/20 CHMAM | 5160 | 4.4 |
| 45 | 67 AA/23 AMPS/10 Sty | 11000 | 5.9 |
| 46 | 67 AA/23 AMPS/10 Sty | 2300 | 1.5 |
| 46a | 64 AA/30 AMPS/6 SS | 4600 | 1.0 |

AS = allyl sulfonic acid
SS = styrene sulfonic acid
MAL = maleic acid
AA = acrylic acid
AM = acrylamide
DIB = diisobutylene
t-BAM = tertiary butyl acrylamide
AMPS = 2-acrylamido-2-methylpropane sulfonic acid
HEMA = hydroxyethyl methacrylate
t-BMAAM = N-t-butyl maleamic acid
VAC = vinyl acetate
EA = ethyl acrylate
HPA = hydroxypropyl acrylate
DMAM = dimethyl acrylamide
AAEM = acetoacetoxyethyl methacrylate
TOAM = tertiary octyl acrylamide
PEM = phosphoethyl methacrylate
DMAPMA = dimethylamino propyl methacrylamide
BMAM = benzyl methacrylamide
CHMAM = cyclohexylmethacrylamide
Sty = styrene In Table I, Examples 1–7, 13, 14 and 17 are shown for comparative purposes. These polymers are presently used as scale inhibitors, but can be seen to be inadequate for controlling silica and silicate scaling. Example 1 is of particular interest because it is generally believed to be the most effective of the conventional technology for silica control. Examples 8–12, 15, 16 and 18–46 show the improvement with copolymers and terpolymers of the present invention. Example 7 demonstrates that a conventional allyl sulfonic acid containing polymer proposed in prior art, does not provide the degree of inhibition shown by compositions of the present invention.

Similarly, Examples 13 and 14 which demonstrate copolymers proposed in prior art to control silica are also less effective. Example 17 illustrates the need for greater than 11 weight percent AMPS on a terpolymer to achieve effective control.

TABLE II

IONIC ADDITIVES ALONE AND WITH POLYMER

| | | NTU | | |
|---|---|---|---|---|
| Example | Ion | 140 mg/l ion | 80 mg/l ion | 80 mg/l ion plus 100 ppm Polymer of Example 23 |
| 47 | Fe | 58.1 | 51.5 | 11.6 |
| 48 | Zn | 78.5 | 40.5 | 30.0 |
| 49 | B4O7 | 91.7 | 46.9 | 4.2 |
| 50 | Al | 22.8 | 32.9 | 1.4 |
| 51 | Mn | 40.3 | 39.9 | 13.4 |
| 52 | Ba | 75.3 | 78.4 | 5.5 |
| 53 | Sr | 52.5 | 34.8 | 2.2 |
| 54 | Ca | 54.8 | 52.0 | 5.2 |
| 55 | Mg | 6.0 | 9.0 | 1.3 |
| 23 | none | — | — | 1.9 |
| 56 | None (no polymer) | (22.6) | (22.6) | — |

Table II presents the results of testing a variety of a ionic additives alone and in mixture with a polymer additive. Most of the ionic additives when tested above caused an increase in precipitation as would be expected since metal ion salts of silicate are components of the scale. Magnesium ion, however, inhibited precipitation. This effect is particularly surprising in that the test water already contains magnesium ion. This result demonstrates the value of adding additional magnesium ion for inhibiting the precipitation of silicate scale even though the presence of magnesium ion in the test water or natural water is one of the contributors to the precipitation and scaling.

When the ionic additives are tested in mixture with the terpolymer of Example 23, only addition of magnesium ion and of aluminum ion further improved performance compared to terpolymer alone. This is also unexpected, for the reasons previously cited as well as an expected interference by cationic metal ions with the performance of an anionic terpolymer. This adverse effect is illustrated by adding ions other than aluminum and magnesium.

The results of testing mixtures of the metal ions of aluminum or magnesium with a range of polymers are presented in Table III. Addition of one or the other of these two ions improved the performance of most of the polymers tested. The combination of magnesium ion and the polymers of Examples 1, 11, 23, 24, 29 and 32 produced effective inhibition of precipitation of silica and silicate; less than 8 NTU. The combination of aluminum ion with polymers of Examples 1, 4, 11 and 23 also showed good performance. Neither ion give adequate performance with polymers of Examples 2, 6 and 14.

TABLE III

METAL IONS PLUS POLYMERS

| | | NTU | | |
|---|---|---|---|---|
| | | Polymer | Polymer plus 80 mg/l of | |
| Example | Polymer | alone | Al | Mg |
| 57 | none | 22.6 | 32.6 | 9.3 |
| 58 | Ex. 1 | 12.8 | 2.5 | 1.9 |
| 59 | Ex. 2 | 35.4 | 29.6 | — |
| 60 | Ex. 4 | 26.7 | 7.3 | 28.8 |
| 61 | Ex. 6 | 40.1 | 33.9 | — |
| 62 | Ex. 11 | 3.9 | 1.4 | 3.5 |
| 63 | Ex. 12 | 0.9 | 1.2 | 1.1 |
| 64 | Ex. 14 | 11.7 | — | 9.9 |
| 65 | Ex. 23 | 1.9 | 1.4 | 1.3 |
| 66 | Ex. 24 | 1.9 | 2.7 | 1.2 |
| 67 | Ex. 32 | 2.9 | 3.7 | 1.1 |
| 68 | Ex. 29 | 1.0 | 1.1 | 0.6 |

The method of the present invention has been described and exemplified in detail herein. Modifications and changes, however, may become apparent to those skilled in the art without departing from the spirit and scope of the invention. The modifications, for example, may include using other conventional water treatment chemicals along with the additives of the present invention. This would include other scale inhibitors, such as for example phosphonates, to control scales other than silica, corrosion inhibitors, biocides, dispersants, defoamers and the like.

In detergent applications, silica and silicate scale can be a problem in either of two ways: it can deposit on fabric surfaces resulting in greying of the fabric and increased stiffness, or it can deposit on heat transfer surfaces of machines resulting in a decrease in heat transfer efficiency. The method of the present invention was evaluated for silica scale inhibition in detergent formulations to quantitatively assess the effects on the deposition of silica and silicate scale on fabric, and the effects on the greying of fabric.

Typical liquid detergent formulations shown in TABLE IV and typical powder detergent formulations are shown in TABLE V. These formulations are shown as examples of detergent formulations and are not intended to limit the scope of the present invention.

TABLE IV

LIQUID COMPOSITIONS

| | Un-built | Cit-rate | Citrate/ Fatty Acid Soap | Phos-phate | Non-Phos-phate |
|---|---|---|---|---|---|
| LAS | 3.5 | 15 | 8 | 7 | 19 |
| Alc. Ether Sulfate | — | — | 16 | — | — |
| Citrate | — | 10 | 6 | — | — |
| Fatty Acid Soap | — | — | 10 | — | — |
| Nonionic Surfactant | 16 | 7.5 | 6 | 3 | 15 |
| Propylene Glycol | — | — | 8 | — | 4 |
| Ethanol | 5 | — | 4 | — | 8.5 |
| Na Xylene Sulfonate | — | 5.5 | — | — | — |
| Opt. Brightener | 0.2 | 0.2 | 0.15 | 0.1 | 0.25 |
| Enzyme | 0.7 | — | 0.5 | 0.5 | 0.75 |
| Water | Q.S. | Q.S. | Q.S. | Q.S. | Q.S. |
| Borax | — | — | — | 3 | — |
| Tripolyphosphate | — | — | — | 23 | — |
| Glycerin | — | — | — | 6 | — |

TABLE V

POWDER COMPOSITIONS

| | TPP[1] | PYRO[2] | Phos-phate | NON-Phos-phate |
|---|---|---|---|---|
| LAS[3] | 5 | 5 | 6 | 7.5 |
| Lauryl Sulfate | 8 | 13 | — | — |
| Alcohol Ether Sulfate | 3 | — | — | — |
| PEO[4] Alcohol | 1.5 | 2 | — | — |
| TPP | 38 | — | 30 | — |
| Pyro | — | 30 | — | — |
| Sodium Carbonate | 10 | 13 | 7 | 7.5 |
| Sodium Sulfate | 15 | 24 | 15 | 20 |
| Sodium Silicate | 6 | 5 | 5 | 1.5 |
| Zeolite A | — | — | — | 25 |
| Opt. Brightener | 0.2 | 0.2 | 0.2 | 0.2 |
| Enzyme | 0.5 | 0.5 | 0.3 | 0.3 |
| NaPAA[5] | — | 0.7 | — | — |
| Soap | — | — | 1.0 | — |
| Nonionic (EO/PO[6]) | — | — | 5 | 5 |
| Perborate | — | — | 20 | 22.5 |
| TAED[7] | — | — | 4 | — |
| Anti-Redep. Agents | — | — | .02 | 0.2 |
| Water | Q.S. | Q.S. | Q.S. | Q.S. |

[1]Sodium Tripolyphosphate
[2]Sodium Pyrophosphate
[3]Linear Alkyl Sulfonates
[4]Polyethoxylate
[5]Sodium salt of polyacrylic acid
[6]Ethylene Oxide/Propylene Oxide
[7]Tetraacetyl Ethylene Diamine The effects on greying were evaluated by measuring the whiteness index of cloths before they were washed, and after they had been washed twenty-five times. The effects of deposition were evaluated by comparing data from unwashed, ashed cloths to data from cloths washed twenty-five times and then ashed. This was done to determine the amount of inorganic material deposited on the cloth during the washing.

The tests were run as follows:

Kenwood brand Mini-E washing machines were filled with six liters of tap water. Calcium chloride and magnesium chloride were added to the water to yield 400 ppm of hardness and in a ratio of calcium ions to magnesium ions of 2:1, calculated as calcium carbonate. The washing machines were loaded with approximately 500 grams of fabric, including all-cotton terry fabric, cotton fabric, cotton/polyester blends, and polyester fabric. Then, 7.2 grams of soil (equal parts by weight of used motor oil and potting soil) was added to the washing machine. A detergent was added to the machine and the machine was run for an entire cycle. The loads were run for 25 complete cycles, with addition of soil and detergent before each cycle. Other washing conditions used in these experiments are found in TABLE VI.

TABLE VI

WASH CONDITIONS

| APPARATUS | Kenwood Mini-E |
|---|---|
| TEMPERATURE | WARM (60° C.) |
| | HOT (90° C.) |
| HARDNESS | 400 PPM (267 PPM $Ca^{++}$, 133 PPM $Mg^{++}$) |
| WASH CYCLE | 30 MINUTES |
| WASH BATH VOLUME | 6 LITERS |
| DETERGENT DOSAGE | LOW (6.0 GRAMS/LITER WATER) |
| | HIGH (10.0 GRAMS/LITER WATER) |
| POLYMER CONCENTRATION | 3.0% SOLIDS (NEUTRALIZED, pH 7) |

The data appearing in TABLE VII are the Whiteness Index obtained from the all-cotton terry fabrics. Whiteness indices (W.I.) are calculated as:

$$W.I. = 3.387(Z) - 3(Y)$$

where Y, and Z are reflectance values measured using a Pacific Scientific Colorimeter (Colorgard System 1000).

The data appearing in TABLE VIII are the ash content of the all-cotton terry cloths before washing and after twenty-five cycles. Cloth samples were dried overnight at room temperature. The cloths were then weighed and placed in a Thermolyne brand muffle furnace (Model number 30400) for 6-7 hours at 800° C. under air. After cooling to room temperature, the ashes that remained were weighed. The value reported is the percentage of the weight of ash of the original sample cloth to the weight of ash of the washed cloth.

TABLE VII

| | WHITENESS INDEX | | | |
|---|---|---|---|---|
| Temperature: | Low | | High | |
| Detergent Dosage: | Low | High | Low | High |
| Polymer | | | | |
| None | 87.7 | — | — | — |
| Control | 105.3 | 116.7 | 43.3 | 54.4 |
| Example #23 | 110.9 | 118.1 | 60.9 | 82.0 |
| Example #11 | — | 121.2 | 69.9 | 57.1 |
| Example #10 | — | 117.6 | 37.0 | 43.3 |
| Before Laundering | 77.6 | | | |

TABLE VIII

| Temperature: | ASH CONTENT | | | |
| --- | --- | --- | --- | --- |
| | Low | | High | |
| Detergent Dosage: | Low | High | Low | High |
| Polymer | | | | |
| None | 1.47 | — | — | — |
| Control | 0.66 | 0.56 | 3.77 | 3.90 |
| Example #23 | 0.43 | 0.35 | 2.46 | 2.18 |
| Example #11 | — | 0.45 | 2.04 | 4.00 |
| Example #10 | — | 0.64 | 2.60 | 3.44 |
| Before Laundering | 0.32 | | | |

We claim:

1. A method for controlling silica or silicate scale formation in an aqueous system selected from the group consisting of a cooling tower, a boiler, an aqueous sugar concentrate being evaporated during sugar production, a drive fluid used to enhance oil recovery, and a water undergoing controlled temperature reduction in geothermal processes comprising adding to said system an effective amount of a scale inhibitor selected from the group consisting of:

a) a water soluble terpolymer of (meth)acrylic acid or maleic acid or salts thereof of weight average molecular weight from about 1000 to about 25000 where the terpolymer is formed from:

1) from about 30 to about 80 weight percent of (meth)acrylic or maleic acid, and
2) from about greater than 11 to about 40 weight percent of a (meth)acrylamido methylpropane sulfonic acid or styrene sulfonic acid, and
3) from about 5 to about 30 weight percent of (meth)acrylamide or a substituted (meth)acrylamide, or
4) from about 5 to about 30 weight percent of vinyl alcohol, allyl alcohol, an ester of vinyl or allyl alcohol, vinyl esters characterized by the formula:

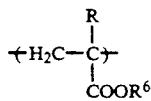

wherein R is H or CH$_3$, R$^6$ is a C$_{1-6}$ alkyl, or a C$_{6-10}$ aryl or aralkyl; styrene, isobutylene or diisobutylene, or 5) from about 3 to about 30 weight percent of styrene sulfonic acid when (meth)acrylamido methylpropane sulfonic acid is present b) magnesium ion,
c) a mixture of the above terpolymers with aluminum ion or magnesium ion,
d) a mixture of poly(meth)acrylic acid or polymaleic acid or salts thereof, of weight average molecular weight from about 1000 to about 25000, with aluminum ion or magnesium ion, to inhibit the precipitation of silica or silicate scale in said aqueous system.

2. The method of claim 1 where said (meth)acrylamido methyl propane sulfonic acids have the formula:

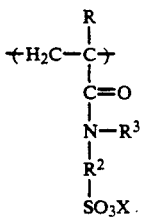

wherein R is H or CH$_3$, X is H or metal cation, R$^2$ is C$_{1-8}$ alkyl or phenyl and R$^3$ is H or C$_{1-4}$ alkyl.

3. The method of claim 1 where said substituted (meth)acrylamides have the formula:

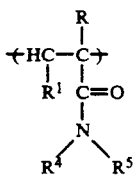

wherein R$^1$ is H or COOX, X is H or metal cation, R$^4$ and R$^5$ are either H or a C$_{1-8}$ alkyl, but both cannot be H, and R is H or CH$_3$.

4. The method of claim 1 where said vinyl esters are characterized by the formula:

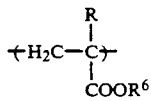

wherein R is H or CH$_3$, R$^6$ is a C$_{1-6}$ alkyl, or a C$_{6-10}$ aryl or aralkyl.

5. The method of claim 1 where said water soluble terpolymer has a weight average molecular weight of from about 2000 to about 10000.

6. The method of claim 1 where said water soluble terpolymer is comprised from about 45 to about 67 weight percent acrylic acid, from about 17 to about 40 weight percent 2-acrylamido-2-methyl propane sulfonic acid and from about 5 to about 30 weight percent of a third unit selected from the group of acrylamide, substituted acrylamide, vinyl alcohol, allyl alcohol, an ester of vinyl or allyl alcohol, vinyl esters, vinyl acetate and styrene.

7. The method of claim 1 where said water soluble terpolymer is comprised from about 45 to about 75 weight percent acrylic acid, from about 17 to about 40 weight percent 2-acrylamido-2-methyl propane sulfonic acid and from about 4 to about 10 weight percent of styrene sulfonic acid.

8. The method of claim 1 where the magnesium ion is derived from magnesium chloride or magnesium sulfate.

9. The method of claim 1 where said aqueous system is a cooling tower.

10. The method of claim 1 where said aqueous system is a boiler.

11. The method of claim 1 where the scale inhibiting amount is within the range of 0.1 to 500 parts per million.

12. The method of claim 1 where said aqueous system is an aqueous sugar concentrate being evaporated during sugar production.

13. The method of claim 1 where said aqueous system is drive fluid used to enhance oil recovery.

14. The method of claim 1 where said aqueous system is water undergoing controlled temperature reduction in geothermal processes.

15. The method of claim 1, wherein: silica or silicate are present in the aqueous system as corrosion inhibitors.

* * * * *

UNITED STATES PATENT AND TRADEMARK OFFICE
CERTIFICATE OF CORRECTION

PATENT NO. : 5,277,823                                             Page 1 of 2

DATED      : Jan. 11, 1994

INVENTOR(S) : William M. Hann, et al

It is certified that error appears in the above-indentified patent and that said Letters Patent is hereby corrected as shown below:

The title page, should be deleted to be replaced with the attached title page.

Figure 2:
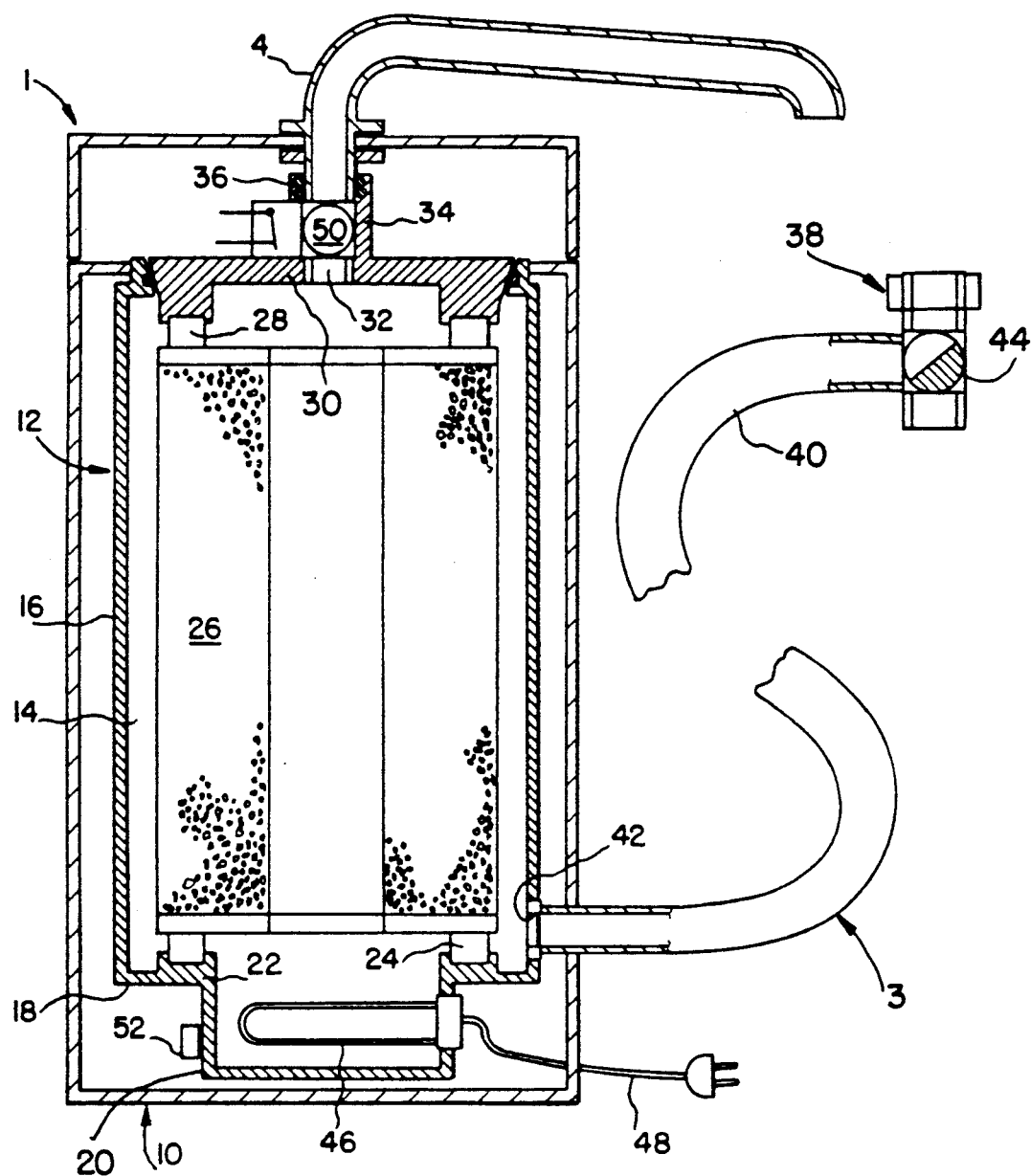
Figure 3:
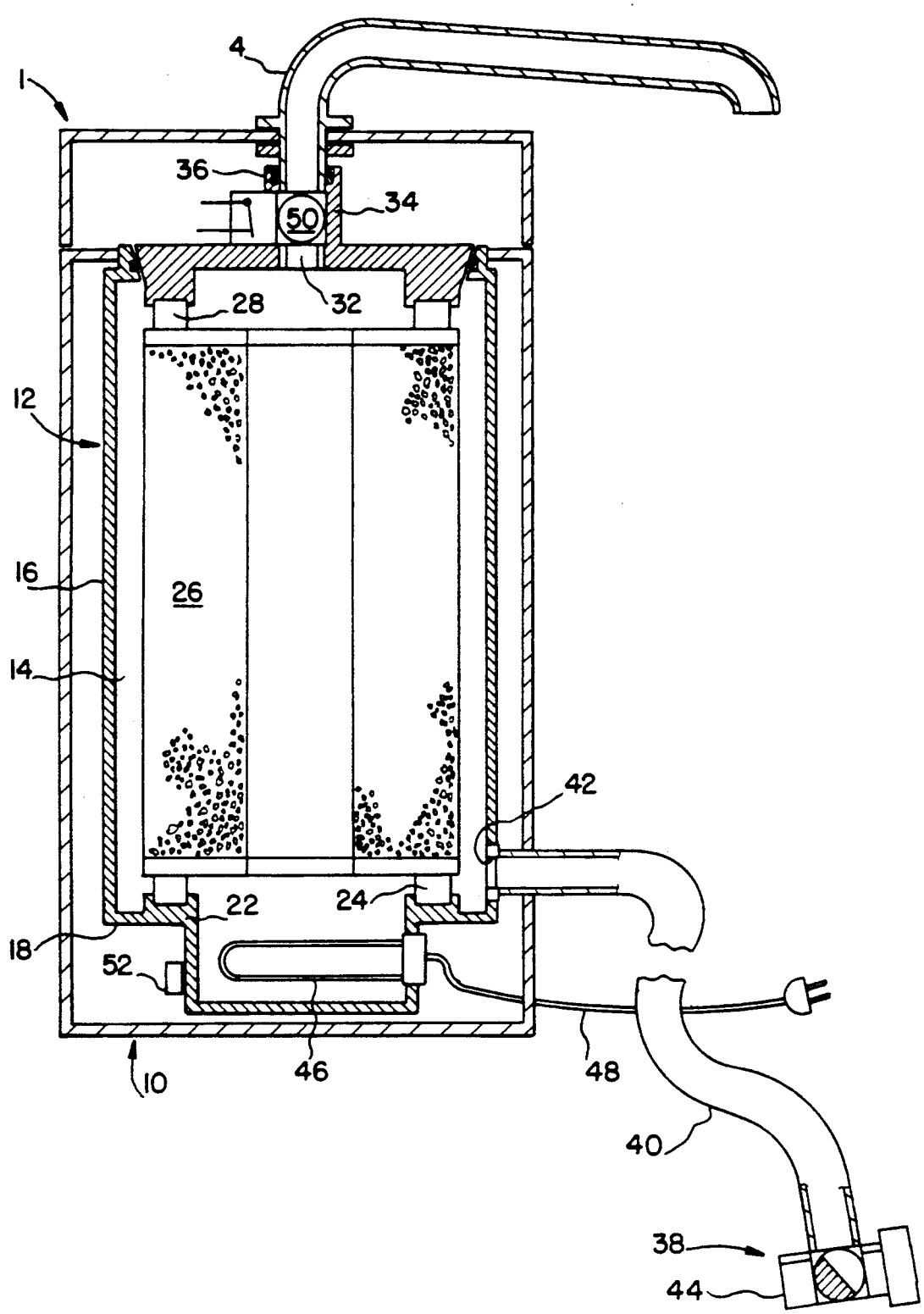
Figure 4:
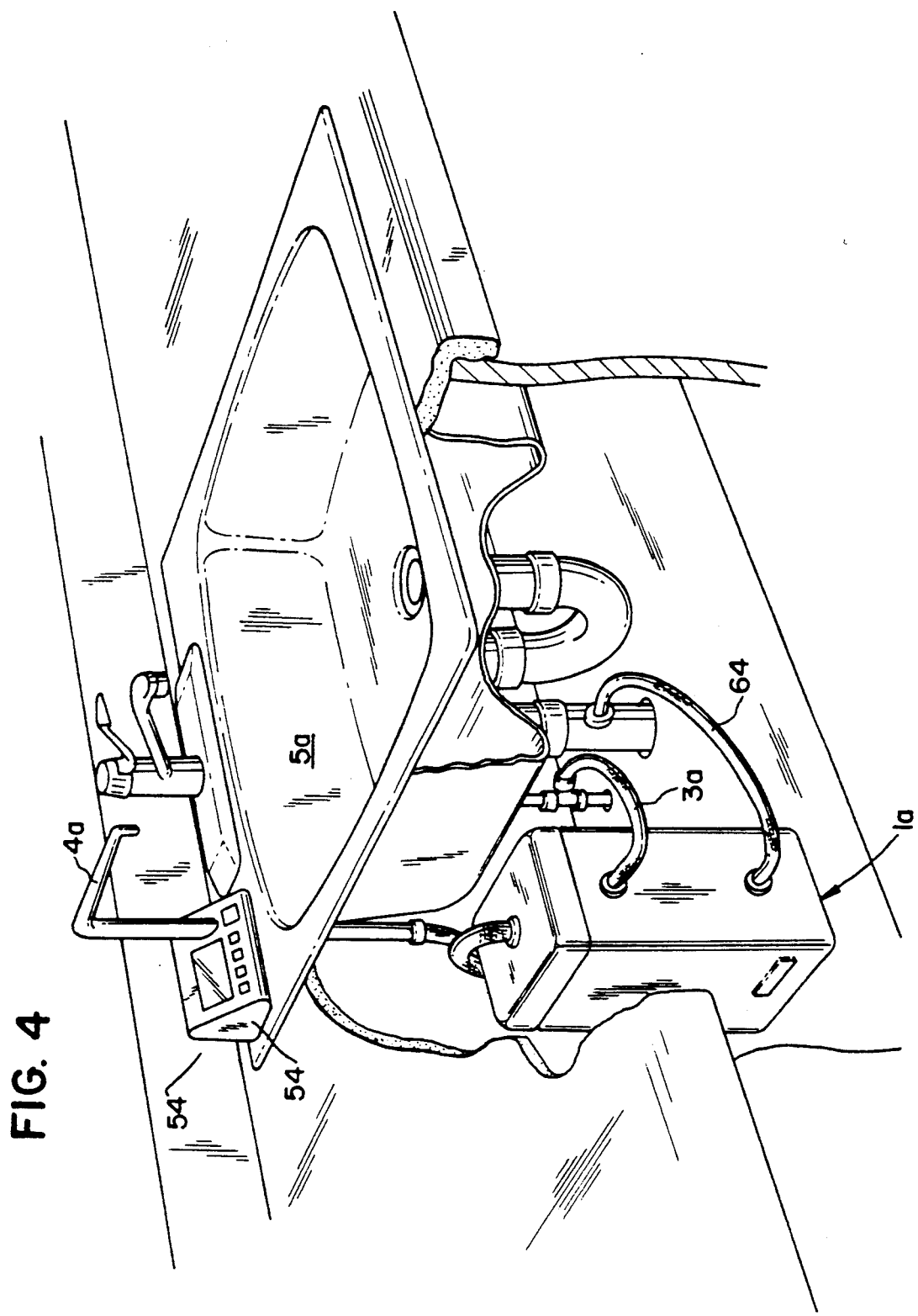
Figure 5:
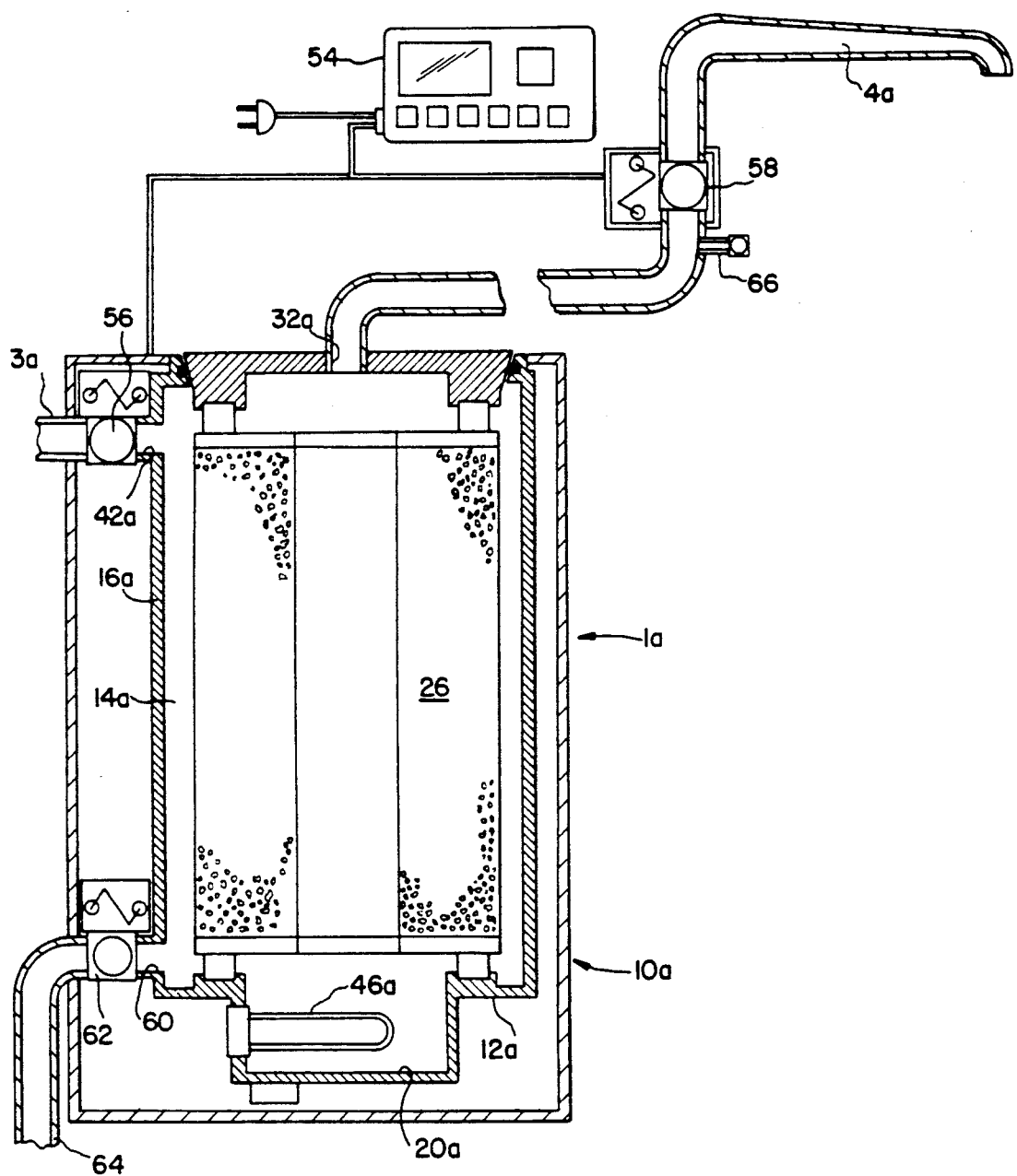

The drawing sheets, consisting of Figs. 1 - 5, should be deleted.

Signed and Sealed this

Thirty-first Day of May, 1994

*Attest:*

BRUCE LEHMAN

*Attesting Officer*                      *Commissioner of Patents and Trademarks*

United States Patent [19]

Hann et al.

[11] Patent Number: 5,277,823
[45] Date of Patent: Jan. 11, 1994

[54] SILICA SCALE INHIBITION

[75] Inventors: William M. Hann, Gwynedd; Judy H. Bardsley, Salford; Susan T. Robertson, Ambler; Jan E. Shulman, Newtown, all of Pa.

[73] Assignee: Rohm and Haas Company, Philadelphia, Pa.

[21] Appl. No.: 5,411

[22] Filed: Jan. 19, 1993

Related U.S. Application Data

[63] Continuation of Ser. No. 805,434, Dec. 11, 1991, abandoned, which is a continuation-in-part of Ser. No. 527,420, May 23, 1990, abandoned.

[51] Int. Cl.⁵ .................................................. C02F 5/08
[52] U.S. Cl. ............................ 210/696; 60/641.2; 127/61; 166/244.1; 210/698; 210/701; 252/175; 252/180; 252/181
[58] Field of Search .................... 166/244.1, 310; 210/696-701; 252/82, 180, 181, 175; 60/641.2; 127/61

[56] References Cited

U.S. PATENT DOCUMENTS

| | | | |
|---|---|---|---|
| 2,723,956 | 11/1955 | Johnson | 210/698 |
| 4,288,327 | 9/1981 | Godlewski et al. | 210/698 |
| 4,584,104 | 4/1986 | Dubin | 210/696 |
| 4,797,223 | 1/1989 | Amick et al. | 210/701 |
| 4,830,766 | 5/1989 | Gallup et al. | 210/696 |
| 4,913,823 | 4/1990 | Lipinski et al. | 252/180 |
| 4,933,090 | 6/1990 | Gill et al. | 210/700 |
| 4,936,987 | 6/1990 | Persinski et al. | 210/701 |
| 4,952,326 | 8/1990 | Amjad et al. | 210/701 |
| 5,078,879 | 1/1992 | Gill et al. | 210/701 |

FOREIGN PATENT DOCUMENTS 3743739  7/1989  Fed. Rep. of Germany.

*Primary Examiner*—Peter A. Hruskoci
*Attorney, Agent, or Firm*—David T. Banchik; James G. Vouros

[57] ABSTRACT

A method for inhibiting silica scale formation in aqueous systems using selected low molecular weight (meth-)acrylic or maleic acid based copolymers or terpolymers, magnesium ion alone, or the selected copolymers and terpolymers with aluminum ion or magnesium ion, or polyacrylic or polymaleic acid with aluminum ion or magnesium ion.

15 Claims, No Drawing Sheets